United States Patent [19]
Girvin

[11] Patent Number: 5,179,873
[45] Date of Patent: Jan. 19, 1993

[54] BICYCLE CRANK ASSEMBLY

[75] Inventor: Robert H. Girvin, Holliston, Mass.
[73] Assignee: Ocean State International, Inc., Woonsocket, R.I.
[21] Appl. No.: 756,540
[22] Filed: Sep. 9, 1991
[51] Int. Cl.$^5$ .............................. G05G 1/14
[52] U.S. Cl. ......................... 74/594.1; 74/594.2; D12/123; 280/259
[58] Field of Search ............... 74/594.1, 594.2; D12/123; 280/259

[56] References Cited

U.S. PATENT DOCUMENTS

| | | | |
|---|---|---|---|
| 4,811,626 | 3/1989 | Bezin | 74/594.1 |
| 5,010,785 | 4/1991 | Romero | 74/594.1 |

FOREIGN PATENT DOCUMENTS 3902272  8/1990  Fed. Rep. of Germany ..... 74/594.1

Primary Examiner—Leslie A. Braun
Assistant Examiner—Andrea Pitts
Attorney, Agent, or Firm—Wolf, Greenfield & Sacks

[57] ABSTRACT

A bicycle crank assembly utilizing a hollow crank arm is disclosed. The crank arm is welded to a hub for mounting to an axle and reinforced using a doubler provided at a point of maximum stress to minimize the likelihood of breakage at the maximum stress point. The resulting bicycle crank assembly exhibits reduced weight without a substantial reduction of torsional or bending strength.

19 Claims, 3 Drawing Sheets

BICYCLE CRANK ASSEMBLY

FIELD OF THE INVENTION

The present invention relates to crank assemblies for bicycles.

BACKGROUND OF THE INVENTION

For quite some time, designers of competitive as well as recreational bicycles have sought to design bicycle components in a manner that minimizes the weight of the individual component without significantly sacrificing the strength of the component. It is axiomatic that if weight can be reduced without decreasing strength, a bicycle can be provided that will allow the rider to achieve substantially better performance without increasing the likelihood of failure of the bicycle. This enhanced performance translates to greater speed and/or duration or a reduction of fatigue experienced by the rider over any given course for any period of time.

In this past, attempts to make bicycles lighter have concentrated on the fabrication of bicycle components from stronger and lighter materials such as aluminum. These materials are utilized not only in constructing the wheels of the bicycle but also in construction of the frame and of various other components.

Great efforts are currently under way in the bicycle manufacturing industry to design bicycles that are light in weight without sacrificing strength.

One component that has been subject to considerable design research is the crank arm. Commonly, a bicycle includes two crank arms which are located approximately 180° apart relative to a hub bearing assembly. The outer end of each crank arm is connected to a pedal which is used by the rider to apply a force which results in movement of the bicycle.

Builders of bicycles have repeatedly attempted to redesign the crank to allow them to be fabricated of stronger, lighter material. However, since the crank arms directly transfer the muscle power of the rider into a propelling force of the bicycle, the crank arms are subjected to a significant amount of torque and bending moment. Because it is common for a bicycle to be operated for an extended period of time over varied terrain, the continuous stress applied over such periods of time have resulted in failure of the crank arms.

Accordingly, there is a need to construct a crank arm for bicycle having a reduced weight while at the same time being strong enough to minimize the likelihood of failure despite high torsional and bending stresses applied over an extended period of time.

SUMMARY OF THE INVENTION

The present invention relates to a bicycle crank assembly having reduced weight and enhanced strength. The bicycle crank assembly has a crank arm fabricated of a hollow tube having an oval cross section. The crank arm is welded to a cylindrical hub which receives rotational pedaling forces from the crank arm. Overlapping a portion of the location at which the crank arm is welded to the hub, a doubler is provided to reduce stress by creating a secondary load path. The doubler is preferably shaped in a manner that distributes the load from the arm away from the maximum stress point and creates a redundant load path, thereby lessening the criticality of the weld between the arm and the hub at the maximum stress point. The doubler can be tapered at the end located on the arm thereby permitting it to gradually receive stress from the arm. In addition, the doubler can be angled at the end at which is it welded to the hub to thereby distribute stress into the hub, directing the stress toward a sprocket-mounting flange.

Thus, it is one object of the present invention to provide a bicycle crank assembly having reduced weight.

It is another object of the present invention to provide a bicycle crank assembly that is sufficiently strong to avoid breaking despite repeated and long term application of high bending and torsional stresses.

It is still another object of the present invention to provide a bicycle crank assembly having a secondary load path to direct torsional and bending stresses away from the area where the crank arm is welded to its hub.

It is yet another object of the present invention to provide a means for distributing stress into the hub and directing stress toward the flange.

It is still another object of the present invention to provide a bicycle crank assembly which reduces the criticality of the weld joining the crank to the hub.

Other objects and features of the present invention will become apparent from the following detailed description when taken in connection with the accompanying drawings. It is to be understood that the drawings are designed for the purpose of illustration only, and are not intended as a definition of the limits of the invention.

DESCRIPTION OF THE PREFERRED EMBODIMENTS

Figure 1:
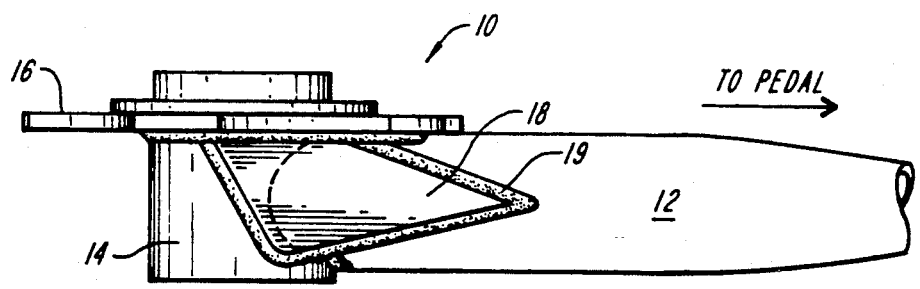
FIG. 1 is a schematic, top view of a bicycle crank assembly of the present invention.
Figure 2:
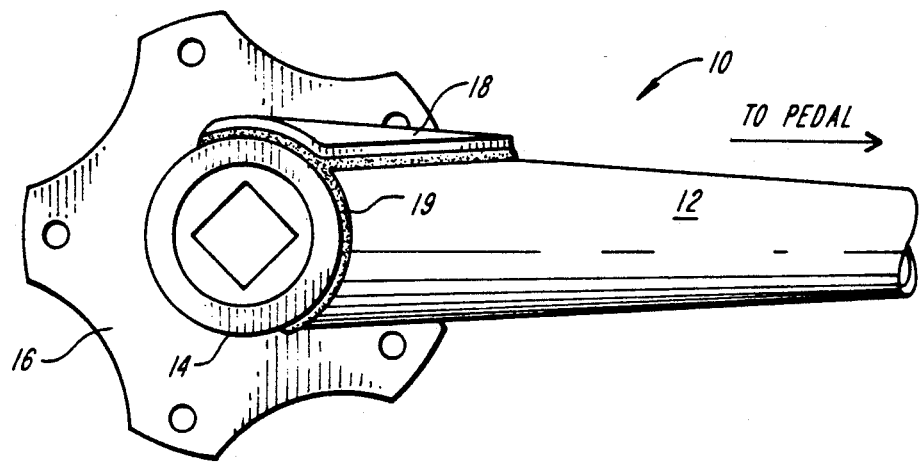
FIG. 2 is a schematic side view of the bicycle crank assembly of FIG. 1.
Figure 3:
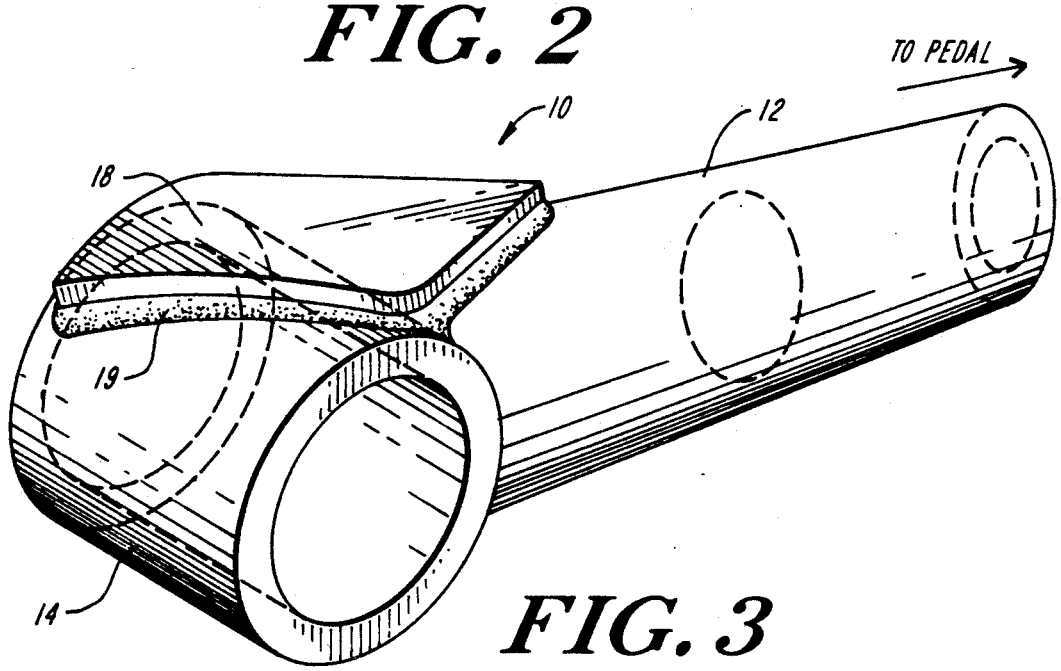
FIG. 3 is a schematic perspective view of the hub, arm and doubler of FIGS. 1 and 2 of the present invention.
Figure 4:
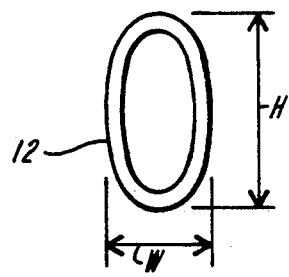
FIG. 4 is a schematic, cross sectional cut away of a bicycle crank arm depicting its overall cross-sectional shape.

Referring particularly to the Figures, the present invention comprises a bicycle crank assembly 10 shown in whole and in part in various views in FIGS. 1-3. The assembly 10 comprises a hollow tubular crank arm 12 affixed, preferably by welding, to a cylindrical hub 14. The hub is adapted for mounting on an axle (not shown). The cylindrical hub 14 is attached to a flange 16 which serves to transmit pedaling forces from the rider to the bicycle drive wheel or chain sprocket mounted thereto (not shown). The crank arm 12 comprises a hollow tube having an oval cross section as shown in FIG. 4 in which the vertical height H (major axis) is greater than that of the horizontal width W (minor axis). The crank arm is fabricated of a high strength metal such as steel. The use of a crank arm having an oval cross section is particularly preferred because such a configuration maximizes the resistance of the tube against bending in the vertical plane about the horizontal axis while maintaining sufficient strength against torsional or twisting forces which occur during pedaling.

In addition to the foregoing, the doubler 18 has been provided to overlap a maximum stress point which is defined as the point at the connection of the arm to the hub 14 that is subjected to maximum stresses during pedaling. This point is located on the arm 12 next to the uppermost portion of the weld when the arm is in a horizontal orientation with its pedal end toward the front wheel of the bicycle. The significant downward forces applied by the rider to the crank arm subject the weld at this point and the adjacent portion of the crank arm to the most substantial tensile stresses. Like the crank arm 12, the doubler 18 can be fabricated of high strength steel. It is preferred that the doubler 18 be welded 19 into position. The doubler 18 serves to double the material thickness at the maximum stress point and also serves to create an additional, secondary load path which lowers stress levels. In so doing, the doubler further insures against faulty welds between the arm 12 and hub 14 and provides an improved distribution of loads into the hub whereby significantly enhancing the strength of the crank assembly 10 without a significant addition of weight.

The performance of the doubler 18 can be enhanced as a result of a unique shape which serves to gradually receive stress from the crank arm and distribute stresses into the hub. Specifically, the portion of the doubler 18 which is located on the crank arm 12 is preferably tapered to a point directed toward the pedal end of the crank arm. Such a taper is believed to provide structure for gradually receiving stress from the crank arm. In addition, the portion of the doubler 18 that is welded to the hub 14 preferably tapers toward the flange 16. Such a configuration is believed to distribute stresses into the hub 14 toward the location at which the hub 14 is attached to the flange 16.

It is noted that although the crank arm 12 has a vertical dimension H which is approximately equal to the outer diameter of the hub 14, the dimensions of the crank arm 12 need not be so limited. Rather, the crank arm 12 can have a vertical dimension H which is less than or equal to that of the diameter of the hub 14 provided that the resulting crank arm 12 is sufficiently resistant to bending and torsional stresses. However, a crank arm 12 having a vertical dimension H which approximates that of the outer diameter of the hub 14 is preferred because such a configuration allows the doubler 18 to have a relatively flat configuration. Such a configuration allows the doubler to be welded to the crank arm 12 and hub 14 without significant difficulty because it eliminates the need to precisely position the doubler as may be required if the doubler has to be bent to accommodate a more complex geometry. Furthermore, although the crank arm 12 preferably has a hollow, oval cross-section, it is not intended to be strictly limited to such a configuration. Rather, a crank arm 12 having a circular cross-sectional configuration could be used provided that the crank arm is strong enough to resist bending and torsional forces.

Thus, the invention provides a bicycle crank assembly which results in a significant reduction in weight without a substantial decrease in strength. In addition, the invention reduces the criticality of the quality of welds which are used to attach a bicycle crank arm to a spindle.

As discussed herein above, a doubler according to this invention may be utilized in a wide variety of crank arm spindle interconnections for increased strength and durability of the assembly. According to a preferred embodiment it is particularly contemplated to utilize the doubler 18 in conjunction with the crank arm 12 as it is depicted in top and side views in FIGS. 5 and 6. The overall crank arm assembly 20 according to this embodiment comprises generally a hub 14 attached at one end of a tubular crank arm 24 and a pedal mounting lug 26 attached at the opposing pedal end 28 of the crank arm 12. The arm 12, hub 14 and mounting lug 26 are constructed of 4130 steel alloy and each of the hub 14 and pedal mounting lug 26 are attached to the crank arm 12 by means of T.I.G. welds 19 running completely around the contacting surfaces between the arm 12 and each of the hub 14 and pedal lug 26.

The hub 14 is approximately 27 mm in outside diameter and includes a standardized mounting hole 30 disposed axially through its center in order to accept an end of a standard bottom bracket axle (not shown). Similarly, the pedal mounting lug 26 carries a $0.562'' \times 20$ threaded hole 32 for accepting a standard pedal mounting post.

Since the depicted crank arm 12 is intended for mounting on the right hand side of the bicycle frame, it includes a sprocket mounting flange 16 having a plurality of mounting holes 36 disposed thereon. These holes allow the flange to be bolted to a larger chain sprocket (not shown). The preferred left hand crank arm assembly according to this embodiment (not shown) is substantially similar to this right hand crank arm assembly 20 except that it carries no sprocket mounting flange and its doubler is attached in a mirror image location to that of the depicted (FIGS. 5 and 6) assembly.

The crank arm 12 according to this embodiment is a seamless tube having a length between opposing hole 30, 32 centers of 155–185 mm and having a preferred wall thickness of 1.0 mm. The tube tapers from the hub 14 to the pedal end 28 such that the vertical or major axis 38 proximate the hub 14 is approximately 29 mm and the major axis 40 proximate the pedal end 28 is only approximately 20.5 mm. The crank arm tube is angled outwardly from the bicycle frame such that the pedal mounting lug outboard face 41 is disposed at least 4 mm further outwardly than the hub outboard face 43. The vertical axis of the crank arm 12, thus, fully overlaps the diameter of the hub 14 at their interconnection point. Similarly, the horizontal or minor axis tapers from 19.0 mm to 15.0 mm along the tube length from the hub 14 to the pedal end 28. The taper is not necessarily continuous and may be formed, in the preferred embodiment, by exerting a force against diametrically opposing sides of a circular cross-section tube until it obtains a desired oval shape. The tube, prior to exerting the force, in this example is of equal diameter for approximately the first 40% of its length proximate the hub 14 and then tapers for the last 60% of its length toward the pedal end 28. The degree of flattening along the arm's length is varied in order to vary the ratio of the major and minor axes to obtain a predetermined oval cross-sectional profile along the length.

As noted previously, the desired predetermined cross-sectional profile should be one that optimizes crank arm beam strength for both bending and torsional stress. If one assumes that the load imparted by a rider is, for the most part, positioned directly upon the center of the pedal, then one may determine the maximum bending amount and torsional moment acting within the crank arm at any point along its length. A true circular cross-section would be highly resistant to torsion but would have a relatively low bending moment while, a flattened web-like cross-section would be highly resistant to bending but would be prone to torsional deformation. An oval beam, however, may be constructed as a compromise to obtain more equalized bending and torsional stress levels. Such an oval cross-section, at any point along the crank arm's length, should be shaped so that the bending stress and the torsional stress are substantially equal for a given predicted load. The shape may be derived experimentally via strain gauges or theoretically though beam equation modeling. In this manner, crank arm failure by either torsion or bending is just as likely (or unlikely). As such, the arm'strength and durability is optimized for a given tube thickness and material.

Figure 5:
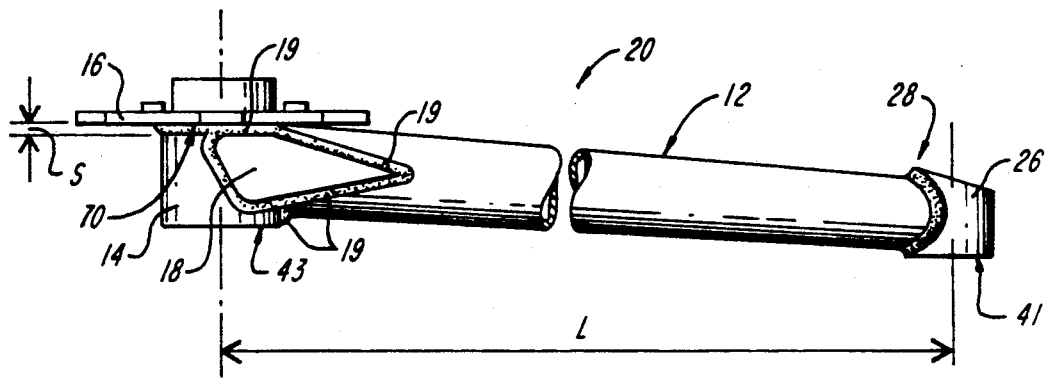
FIG. 5 is top view of a bicycle crank assembly employing the doubler according to a preferred embodiment.
Figure 6:
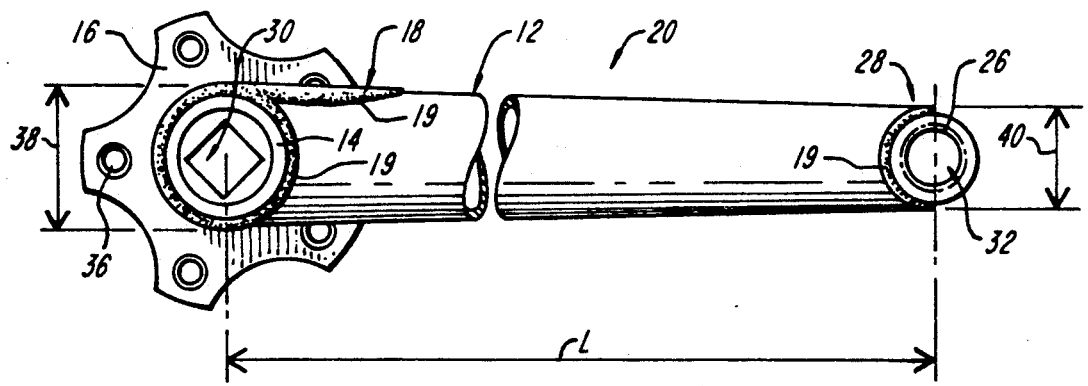
FIG. 6 is a side view of the crank assembly of FIG. 5.
Figure 7:
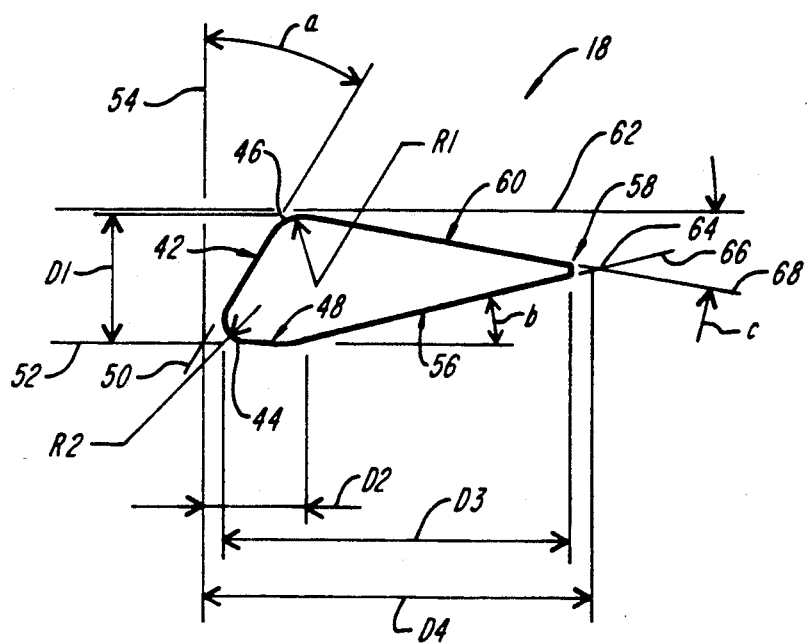
FIG. 7 is top view of the doubler according to the embodiment of FIGS. 5 and 6.

The doubler 18 for use in the embodiment is FIGS. 5 and 6 is shown in detail in FIG. 7. The doubler 18 includes an angled rear side 42 having a depicted width D1 of 16.7 mm between inboard and outboard rear corners 44 and 46 respectively. The rearmost inboard (bottom bracket-facing) side 48 of the doubler 18 has a width D2 of 12.7 mm taken from the intersection of lines 50, 52 extended through the angled rear side 42 and rearmost inboard side 48 respectively. The rear side 42 is particularly disposed at an angle (a) of 30° from a line 54 perpendicular to the rearmost inboard side line 52 in this embodiment. Note that both rear corners 44 and 46 have been rounded to radiuses R1 (6.0 mm) and R2 (3.0 mm) respectively. Radiusing of the rear corners 44 and 46 facilitates a larger weld area and relieves stress concentrations that may otherwise result from sharp corners.

An inboard tapered side 56 of the doubler 18 extends forwardly from the rearward inboard corner 44 of the doubler 18 to a far end 58 a distance D3, equal to 40.1 mm. This inboard tapered side 56 is disposed at an angle (b) equal to 15° relative to the line 52 through the rearmost inboard side 48. Similarly, the opposing forwardly disposed outboard tapered side 60 is angled at an angle (c) equal to 10° from a line 62 parallel to the line 52 through the inboard rearmost side 48 and tangent to the outboard rear corner 46. The inboard and outboard forwardly disposed tapered sides, 56 and 60 respectively, meet at the far end 58 of the doubler 18. This end 58 is slightly blunted in order to facilitate ease of handling and welding and in order to remove any sharp edges that may concentrate stress. A maximum distance D4, equal to 50.8 mm, is obtained between an intersection 64 of lines 66, 68 (the lines 66 and 68 being extended through each of the forwardly tapered sides) and the above described intersection of lines 50 and 52 taken through the angled rear side 42 and inboard rearmost side 48 respectively.

Referring again to FIG. 5, when the doubler is mounted between the hub 14 and crank arm 12, a spacing S of approximately 3.2 mm is formed between the inboard rearmost side 48 of the doubler 18 and the hub inboard face 70 in order to allow for a complete weld 19 of the doubler 18 to the hub 14 along the doubler's inboard facing side. In the depicted position, according to the preferred embodiment, the doubler 18 fully contacts and overlaps the joint between the hub 14 and crank arm 12.

EQUIVALENTS

It should be understood, that the foregoing description of the invention is intended merely to be illustrative thereof, that the illustrative embodiments are presented by way of example only and that other modifications, embodiments, and equivalents may be apparent to those skilled in the art without departing from its spirit.

Having thus described the invention, what we desire to claim and secure by Letters Patent is:

1. A bicycle crank assembly comprising:
   a) a cylindrical hub;
   b) a crank arm having a proximal end and a distal end attached to the hub at its proximal end at a connecting junction, a portion of the junction being subject to maximum tensile stress when the crank arm is driving the hub so as to propel a bicycle in a forward direction; and
   c) a reinforcing member attached to both the crank arm and the hub, which member extends to a location on the crank arm more distal than the junction, and which member fully overlaps the junction at the portion subject to the maximum tensile stress.

2. A bicycle crank assembly of claim 1 wherein the crank arm is hollow.

3. A bicycle crank assembly of claim 2 wherein the crank arm has an oval cross-section.

4. A bicycle crank assembly of claim 1,
   wherein the portion subject to maximum tensile stress comprises a portion of the connecting junction that faces upward when the crank arm is oriented horizontally with the pedal end thereof directed toward the front of a bicycle employing the arm and the hub, and
   the reinforcing member serves to create a secondary load path for stresses that occur in the assembly during pedaling, the secondary load path bearing a secondary tensile stress between a portion of the crank arm and a portion of the hub, the path passing across the portion of the connecting junction subject to maximum tensile stress and relieving stress therefrom.

5. A bicycle crank assembly of claim 1 wherein the reinforcing member is shaped to distribute loads from an area of maximum stress into the hub.

6. A bicycle crank assembly of claim 1 wherein the portion of the reinforcing member that is attached to the crank arm is tapered.

7. A bicycle crank assembly of claim 1 wherein the portion of the reinforcing member is affixed to the hub has an end which is tapered.

8. A bicycle crank assembly of claim 1 wherein the crank arm includes a cross-sectional shape at each point along a length thereof that substantially equalizes torsional strength and bending stress in the crank arm at each point along the length for a predetermined load.

9. In a bicycle crank assembly in which a crank arm is welded to a cylindrical hub, the improvement which comprises providing a reinforcing member on the assembly at an area of maximum stress between the hub and the crank arm.

10. The improvement of claim 9 wherein the crank arm comprises a hollow tube.

11. The improvement of claim 10 wherein the crank arm has an oval cross-section.

12. The improvement of claim 9 wherein the reinforcing member creates a secondary load path in the crank assembly.

13. The improvement of claim 9 wherein the reinforcing member is shaped in a manner to distribute stress loads into the hub.

14. The improvement of claim 9 wherein the portion of the reinforcing member is affixed to the crank arm is tapered.

15. The improvement of claim 14 wherein the portion of the reinforcing member is affixed to the hub has an end which is tapered.

16. The improvement of claim 9 wherein the crank arm includes a cross-sectional shape at each point along a length thereof that substantially equalizes torsional stress and bending stress in the crank arm at each point along the length for a predetermined load.

17. A bicycle crank assembly of claim 1, wherein the reinforcing member is welded to both the crank arm and the hub.

18. A bicycle crank assembly of claim 1, wherein the reinforcing member has a periphery and is welded to the crank arm and the hub about the periphery.

19. A bicycle crank assembly of claim 1, further comprising a flange in contact with the hub, wherein the first end of the reinforcing member has at least one section which tapers decreasingly in width toward the flange so as to gradually transfer pedaling force thereinto, and the second end of the reinforcing member has at least one section which tapers decreasingly in width toward the pedal end of the crank arm so as to gradually receiving pedaling force therefrom.

* * * * *